US011233823B1

(12) United States Patent
Venkataramani et al.

(10) Patent No.: US 11,233,823 B1
(45) Date of Patent: Jan. 25, 2022

(54) EFFICIENT IMPLEMENTATION OF HONEYPOT DEVICES TO DETECT WIDE-SCALE NETWORK ATTACKS

(71) Applicant: Amazon Technologies, Inc., Seattle, WA (US)

(72) Inventors: Eknath Venkataramani, Seattle, WA (US); Daniel J. Miller, Redmond, WA (US); Swati Kulkarni, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 238 days.

(21) Appl. No.: 16/707,578

(22) Filed: Dec. 9, 2019

(51) Int. Cl.
*H04L 29/06* (2006.01)
*G06F 9/455* (2018.01)

(52) U.S. Cl.
CPC ...... *H04L 63/1491* (2013.01); *G06F 9/45558* (2013.01); *H04L 63/1416* (2013.01); *H04L 63/1425* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 10,594,729 | B2* | 3/2020 | Kraenzel | G06N 3/084 |
| 2014/0096229 | A1* | 4/2014 | Burns | H04L 63/1491 |
| | | | | 726/15 |
| 2015/0121529 | A1* | 4/2015 | Quinlan | H04W 12/128 |
| | | | | 726/23 |
| 2017/0302683 | A1* | 10/2017 | Kawauchi | G06F 21/566 |
| 2019/0081980 | A1* | 3/2019 | Luo | G06F 21/53 |
| 2021/0011985 | A1* | 1/2021 | Korotaev | H04L 63/1491 |

* cited by examiner

*Primary Examiner* — Joseph P Hirl
*Assistant Examiner* — Hassan Saadoun
(74) *Attorney, Agent, or Firm* — Knobbe, Martens, Olson & Bear, LLP

(57) ABSTRACT

The present disclosure generally relates to enabling efficient implementation of honeypot devices in a honeypot service environment. Each honeypot device can be implemented as a virtualized device, executing software modified from a production version of a device such that interactions with the honeypot device closely match interactions with a production device. By using virtualization, each honeypot device can be reset to a known good state when a potential security breach occurs. Because network-based attacks are often wide-spread, the honeypot service environment can deduplicate attacks that occur at a large number of devices, discarding duplicate attack traffic to reduce overall load on the environment. While deduplication can be inappropriate for production environments (given the corresponding data loss), deduplication in a honeypot environment can reduce load while still enabling detection of a network attack.

21 Claims, 5 Drawing Sheets

EFFICIENT IMPLEMENTATION OF HONEYPOT DEVICES TO DETECT WIDE-SCALE NETWORK ATTACKS

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

Cloud computing, in general, is an approach to providing access to information technology resources through services, such as Web services, where the hardware and/or software used to support those services is dynamically scalable to meet the needs of the services at any given time. In cloud computing, elasticity refers to network-delivered computing resources that can be scaled up and down by the cloud service provider to adapt to changing requirements of users. The elasticity of these resources can be in terms of processing power, storage, bandwidth, etc. Elastic computing resources may be delivered automatically and on-demand, dynamically adapting to the changes in resource requirement on or within a given user's system. For example, an entity might use a cloud service to host a large online streaming service, set up with elastic resources so that the number of web servers streaming content to users scale up to meet bandwidth requirements during peak viewing hours, and then scale back down when system usage is lighter.

Malicious entities occasionally attempt to disrupt the operations of Web services via network-based attacks ("network attacks"). These attacks typically transmit information to a target device via a network with the intent of disabling or hijacking functionality of the device. While any network attack can be problematic, attacks that attempt to hijack functionality are particularly problematic, as a hijacked device can then itself be used for malicious purposes. For example, a hijacked device can be used to implement further network attacks, sometimes forming a "bot net" comprised of multiple hijacked devices. In some instances, hijacked devices can be used to collect information that is not intended to be made available over a network. For example, an "Internet-of-Things" (or IoT) device—a term which as used herein generally refers to a computing device capable of communicating information about a local physical environment, such as a current temperature—may be hijacked to report private information about a local physical environment, such as a video feed of an in-house camera. The richness of information of IoT devices, paired with an all-to-common lack of secureness of such devices, makes these devices prime targets for network attacks. Often, such attacks occur at a massive scale. For example, an attacker may simultaneously attempt to hijack hundreds, thousands, or millions of devices.

DETAILED DESCRIPTION

Figure 1:
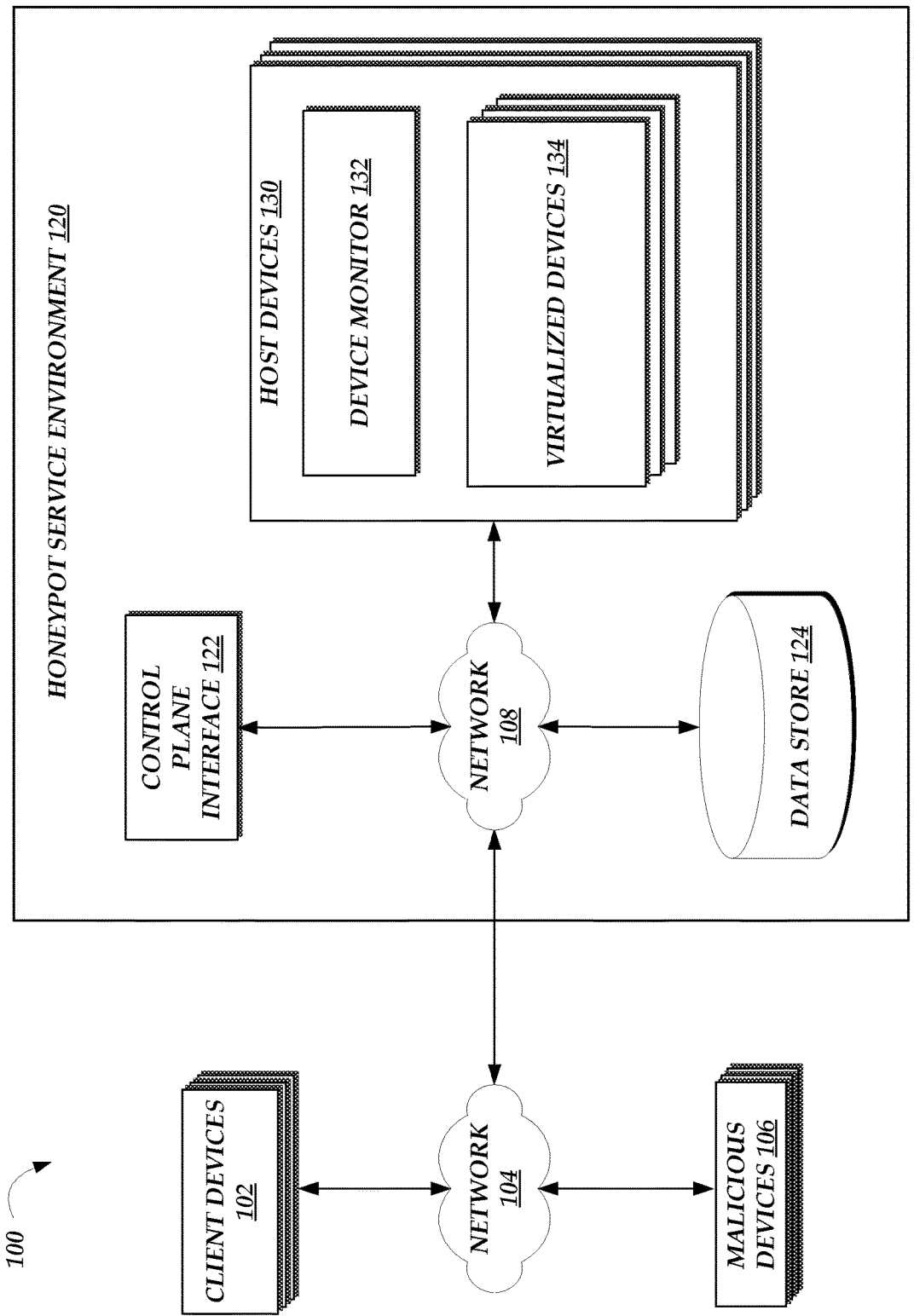
FIG. 1 depicts a schematic diagram of an operating environment according to aspects of the present disclosure, including a honeypot service environment that provides a set of host devices configured to provide clients with the ability to configure virtualized devices to be used as honeypots to detect network attacks on such devices.

Generally described, aspects of the present disclosure relate to implementation of a honeypot service environment, enabling client devices to configure virtualized honeypot devices that attract and detect malicious network traffic such that network attacks represented by the traffic can be analyzed and addressed. As used herein, the term "honeypot device" (or simply "honeypot") refers to a computing device that appears to serve a legitimate purpose, but is in fact created to lure malicious traffic to the device such that the traffic can be captured and analyzed, and configured such that a security breach of the honeypot does not pose provide access to sensitive information or further enable malicious acts. Disclosed herein is a honeypot service environment enabling clients to create virtualized computing devices acting as honeypots, to monitor such honeypots for malicious activity that represents a security breach, and to receive reports of such a breach including traffic monitored as part of the breach. For example, embodiments of the present disclosure may be used to implement a honeypot device that appears to represent an IoT device (referred to herein as an "IoT honeypot"), which type of device is often a frequent target of attack. As discussed herein, use of virtualization technologies can enable creation of high-interaction honeypots, recreating all or a substantial part of a legitimate device's functionalities, while also enabling the honeypot service environment to quickly address breached devices by resetting such devices to a known good state. Moreover, embodiments of the present disclosure can enable efficient handling of wide-scale network attacks, which may be common against IoT devices, by deduplicating attacks within the honeypot service environment. For example, where an attack targets tens, hundreds, or thousands of IoT honeypots in the environment, the environment may select a single IoT honeypot to handle traffic of the attack, reducing the amount of computing resources need to monitor and detect attacks.

In accordance with embodiments of the present disclosure, clients of a honeypot service environment may provide the environment with a device image corresponding to a device that the clients wishes to test for security vulnerabilities, such as an IoT device. A used herein, "device image" generally refers to a set of data, such as contents of a disk drive, sufficient to enable a corresponding device (including a virtual device) to implement a desired functionality. For example, a device image may represent an operating system, software, libraries, etc., such that no additional software is required to implement a device's functionality. Illustratively, where a typical consumer device, such as a physical IoT device used in a production environment, is pre-installed with a specific LINUX™ distribution and software that implements IoT functionality, a device image for the device may also include that distribution and software. In some instances, the software of a device image may be modified in accordance with the image's use as a honeypot device, as opposed to a production device. For example, software of a production device may obtain data from sensors of the device, whereas software of a honeypot device image may obtain data from a "dummy" data file, which file includes data that appears similar to an actual sensor.

On receiving a device image, the honeypot service environment can then provision a virtual computing device with the device image and execute the software of the image, such that the virtual computing device represents a honeypot that appears—from a network perspective—to represent a production device. The honeypot service environment can further expose the honeypot to a network with potentially malicious actors (e.g., the Internet), such that attacks against this type of production device might be directed to the honeypot.

After exposing the honeypot to a network, the honeypot service environment can monitor network traffic to and from the honeypot to detect whether a security breach has occurred. As discussed in more detail below, the honeypot service environment may maintain one or more rules related to network attacks, and compare traffic to a honeypot to the rules to identify security breaches. For example, a service may maintain a "whitelist" indicating acceptable network traffic for a honeypot that is not indicative of a security breach, and a "blacklist" indicating network traffic for the honeypot that is indicative of a security breach. Illustratively, the whitelist may identify traffic that the honeypot or a corresponding production device is expected to transmit without external user interaction (e.g., periodic requests to a server of a provider of the device), while the blacklist may identify traffic that should not occur from the honeypot (e.g., traffic that would occur at a production device only from authorized user access of the device, which access is unexpected at the honeypot). In some instances, a client utilizing the service may create such rules. In other instances, the service may be configured with rules for multiple honeypots, in addition to or alternatively to rules of a client. Illustratively, the service may maintain a rule that similar traffic observed at multiple honeypots representing a given type of device (e.g., coordinated traffic to hundreds of devices) is indicative of a network attack.

In accordance with aspects of the present disclosure, the honeypot service environment disclosed herein can further implement de-duplication techniques to reduce computing resources required to operate honeypots for a given type of device (e.g., a given type of IoT device) and to detect attacks on such devices. Generally, honeypots are utilized to monitor and analyze network attacks, such that they can be addressed by developers of a device (or software used by a device). As such, benefits of recording multiple copies of an attack are small or zero relative to recording a single instance of the attack. Moreover, because attacks can be widespread (spanning hundreds, thousands, or millions of devices), absorbing, monitoring, and analyzing multiple copies of an attack can significantly increase computing resources. For example, each honeypot device may be required to receive traffic of an attack and respond to it (as the traffic may not, at that point, be recognized as an attack), requiring computing resource usage of each device in terms of processing power, memory, network bandwidth and the like, and the honeypot service environment may further be required to analyze each set of traffic to determine whether it corresponds to an attack, consuming still more computing resources.

To address this problematic over-usage of computing resources, the honeypot service environment can be configured in embodiments of the present disclosure to de-duplicate multiple related network attacks. Illustratively, where the environment hosts multiple honeypot devices and similar traffic is received at each device, the environment may select a subset of (e.g., one) instances of the traffic to forward to a fewer than all honeypot devices (e.g., one device), while dropping remaining traffic. This may enable the service to monitor and analyze a single instance of a network attack (providing benefits associated with detecting such an attack on the environment), without incurring the resources required to handle all instances of the attack. In some embodiments, a response of the single device may be provided to a source of the one instance of traffic, such that other instances of the traffic go unanswered. In other embodiments, to preserve an appearance of functionality of the multiple honeypot devices, a response of the single device may be provided as a response to all instances of the traffic, such that all attackers receive a copy of the response, thus maintaining an illusion that multiple devices received and processed the traffic. In this manner, the computing resources required to host and manage honeypot devices on a network are reduced.

The foregoing aspects and many of the attendant advantages of this disclosure will become more readily appreciated as the same become better understood by reference to the following description, when taken in conjunction with the accompanying drawings.

FIG. 1 depicts an example computing environment 100 including a honeypot service environment 120, client devices 102, and malicious devices 106. In accordance with embodiments of the present disclosure, clients, via client devices 102, may configure the service environment 120 to provide network-accessible honeypots, intended to capture traffic from malicious devices 106 represent network attacks to the honeypots.

In FIG. 1, the honeypot service environment 120, client devices 102, and malicious devices 106 are in communication via a network 104, which may include any wired network, wireless network, or combination thereof. For example, the network 104 may be wide area network (WAN), including global area networks (GANs) such as the Internet, cable network, satellite network, cellular telephone network, or combination thereof. The network 104 may be a publicly accessible network, or may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 (as well as networks 118 and 122) can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Client devices 102 and malicious device 102 illustratively represent any computing device accessing the honeypot service environment 102, including for example desktop computers, laptops, smartphones, tablets, e-readers, gaming consoles, and the like. In some instances, malicious devices 106 may be controlled directly by malicious actors. In other instances, malicious devices 106 may be controlled indirectly by malicious actors, such as by operation of a virus, spyware, or the like execution on the malicious devices 106.

The honeypot service environment 120 includes a number of elements enabling clients 102 to configure honeypots within the environment. In FIG. 1, elements of the honeypot service environment 120 are interconnected by a network 08, which illustratively represents an internal network of the honeypot service environment 120.

As shown in FIG. 1, the environment 120 includes a control plane interface 122, a data store 124, and a set of host devices 130 implementing virtualized devices 134 and a device monitor 132. The control plane interface 122 represents one or more devices provide "control plane" functionality of the environment 120, such as configuring and managing honeypots. In network computing environments, "control plane" functionality, used to configure a system, can broadly be contrasted with "data plan" functionality, representing use of the configured system. The control plane generally includes one or more control plane computing devices components distributed across and implemented by one or more control servers (collectively represented by interface 122). Control plane traffic generally includes administrative operations, such as system configuration and management (e.g., resource placement, hardware capacity management, diagnostic monitoring, and system state information). Thus, in accordance with embodiments of the present disclosure, the control plane interface 122 can enable client devices 102 to request creation of honeypots, manage state of honeypots, receive monitoring information of honeypots, and the like.

To facilitate creation of honeypots, the environment 120 further includes a set of host devices 130, which correspond to physical computing devices configured to host one or more virtualized devices 134. Illustratively, the host devices 130 may implement an operating system (in some cases referred to as a "hypervisor") and software that enables creation of virtualized devices 134, such as a LINUX distribution implementing the QEMU™ machine emulator and virtualizor or the Kernel-based Virtual Machine (KVM) Linux module. Each virtualized device 134 may be configured in accordance with the type of production device desired to be virtualized, for example by matching a CPU type, CPU speed, memory type, memory speed, etc., of a typical production device. Thus, when provisioned with a device image, each virtualized device 134 can appear, from a network prospective, as a typical production device. However, each virtualized device 134 can generally be isolated from other devices, such that a "blast radius" of a security breach of the device 134 is minimized. For example, the virtualized devices 134 may not have access to a typical production environment that would exist with a corresponding production device. Moreover, the devices 134 may be configured without access to other virtualized devices 134, and limited to accessing external resources through a host device 130, which, as discussed below, can detect potential breaches of the device 134 and revert of a state of the device 134 to a known good state in the case of such a breach. Device images may be submitted by client devices 102 through the control plan interface 122 and stored within the data store 124, corresponding to any of a variety of known data stores, such as hard disk drives, solid state drives, network accessible storage devices, storage area networks, etc., for use by host devices 130.

In some embodiments, the data store 124 may further store other information used by the honeypot service environment 120. For example, the data store 124 may include attack vector templates, representing information usable to identify a specific attack (or type of attack) represented by one or more network communications. For example, each attack vector template may include one or more regular expressions identifying a pattern in network communications that represents a specific type of attack (e.g., according to an identifier assigned to the type of attack by, for example, the security community). As discussed below, these templates may be used in identifying attacks against honeypot devices or in generating reports regarding operation of honeypot devices.

In addition to virtualized devices 134, host devices 130 include a device monitor 132, representing software executed on the host device 130 to detect security breaches on a virtualized device 132. As discussed in more detail below, each monitor 132 may compare traffic to or from devices 134 to a set of rules to determine whether the traffic indicates a security breach of the device 134 and, if so, to take action in response to that breach, such as transmitting a report to a client device 102 associated with the device 134 and resetting the device 134 to a known good state. In addition and in accordance with embodiments of the present disclosure, a device monitor 132 may monitor traffic to multiple devices 134 in order to deduplicate such traffic, reducing computing resource usage of host devices 130. While shown in FIG. 1 as co-located with virtualized devices 134 on a host device 130, the device monitor 132 may be partially or entirely implemented in a distinct device. For example, deduplication functionality of a monitor 132 may be implemented "up stream" from host devices 130, such as in a load balancer device included within the network 108.

Figure 2:
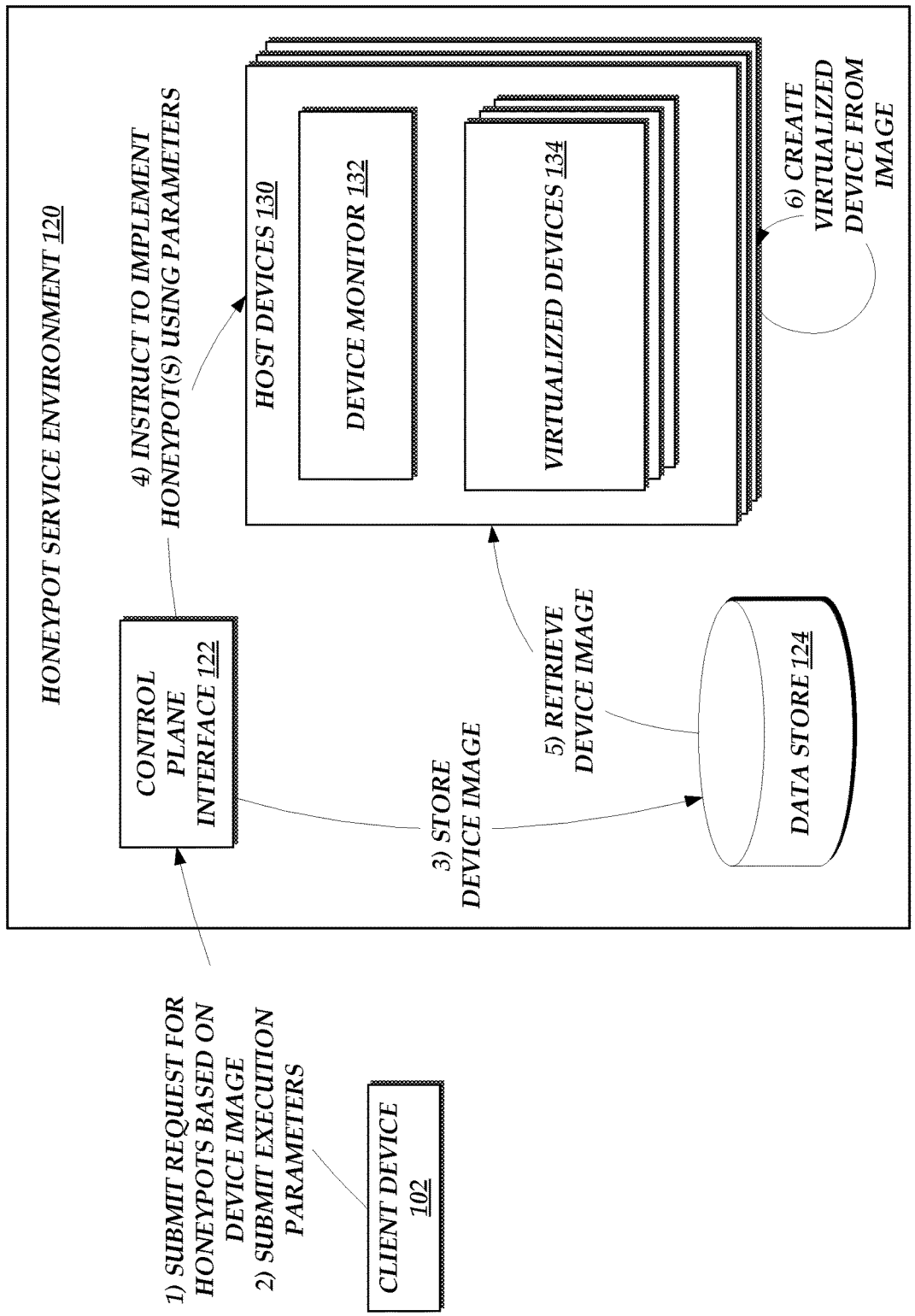
FIG. 2 depicts an example workflow for configuring the virtualized devices of the honeypot service environment to be used as honeypots to detect network attacks on such devices

With reference to FIG. 2, illustrative interactions for creating one or more honeypots on the honeypot service environment 120 will be described. The interactions begin at (1), where a client, utilizing a client device 102, submits to the control plane interface 122 a request for creation of one or more honeypot devices based on a device image, which is illustratively provided by the client device 102. As discussed above, the device image illustratively represents software enabling creation of a virtualized device 134 replicating functionality of a production device, such as a physical IoT device, including software such as an operating system, libraries, applications, etc. The device image is illustratively modified relative to a similar image that may be provisioned onto a physical device, such that production data that would be available to a corresponding production device (e.g., sensor data of a physical environment) is replaced with fabricated data intended to appear, to a malicious device 106, as production data. In some instances, the request to create one or more honeypots may also specify configuration information for a virtualized device 134, such as hardware to be virtualized to execute the software of the device image (e.g., a processor type and speed, memory type and speed, etc.).

In addition, at (2), the client device 102 submits to the interface 122 a set of execution parameters for the honeypot devices. The execution parameters can include options such as a number of honeypot devices to create, a time of execution of the devices, a location of the devices (e.g., geographic, where host devices 130 exist in various geographic locations; network, where host devices 130 can assume a variety of network addresses, etc.), or other options relating to implementation of virtualized devices 134 on the host devices 130 as the honeypot devices (as opposed to operation of the virtualized devices 134 themselves, which can be expected to be configured within the device image). In addition, execution parameters can indicate one or more rules for detecting a security breach at the honeypot devices. For example, parameters may include a whitelist of expected, non-breach-indicating traffic from honeypot devices, a blacklist of traffic indicating a security breach, or the like. Execution parameters can further include notification options for the honeypot devices, such as a storage location (e.g., a client device 102 or other network-based storage) to which to transmit a notification of expected breach and a report of traffic associated with the breach.

At (3), on receiving the request and the execution parameters, the control plane interface 122 stores the device image within the data store 124. In addition, at (4), the interface 122 instructs the host devices 130 to implement the one or more honeypots according to the execution parameters. The host devices 130, in turn at (5), retrieve the device image from the data store 124.

The host devices 130 can then, at (6), create one or more virtualized devices 134 (e.g., in number equal to the desired number of honeypots) from the device image. Specifically, the host devices 130 can generate virtualized devices 134 corresponding to a desired configuration (e.g., a desired processor type and speed, memory type and speed, network configuration, etc.), provision each device 134 with access to the device image, and "boot" each virtualized device 134. Each virtualized device 134 may be implemented, for example, as a KVM or QEMU device with an operating system of the host device 130. Because each virtualized device 134 implements a device image intended to replicate functionality of a "real" production device (e.g., as used for non-honeypot purposes, such as installed in a home or business), each virtualized device 134 illustratively appears—from a network perspective—as such a production device. As such, each virtualized device 134 represents a honeypot that can be expected to attract network attacks in a manner similar to a production device. In one embodiment, each virtualized device 134 is configured to communication with the network 104 with limited or no protections against network attacks, other than protections included within the device image. For example, traffic to the virtualized device 134 may avoid any firewalls, intrusion detection systems, scanners, or the like. This lack of additional protections can increase a likelihood that the honeypots attract malicious traffic.

Figure 3:
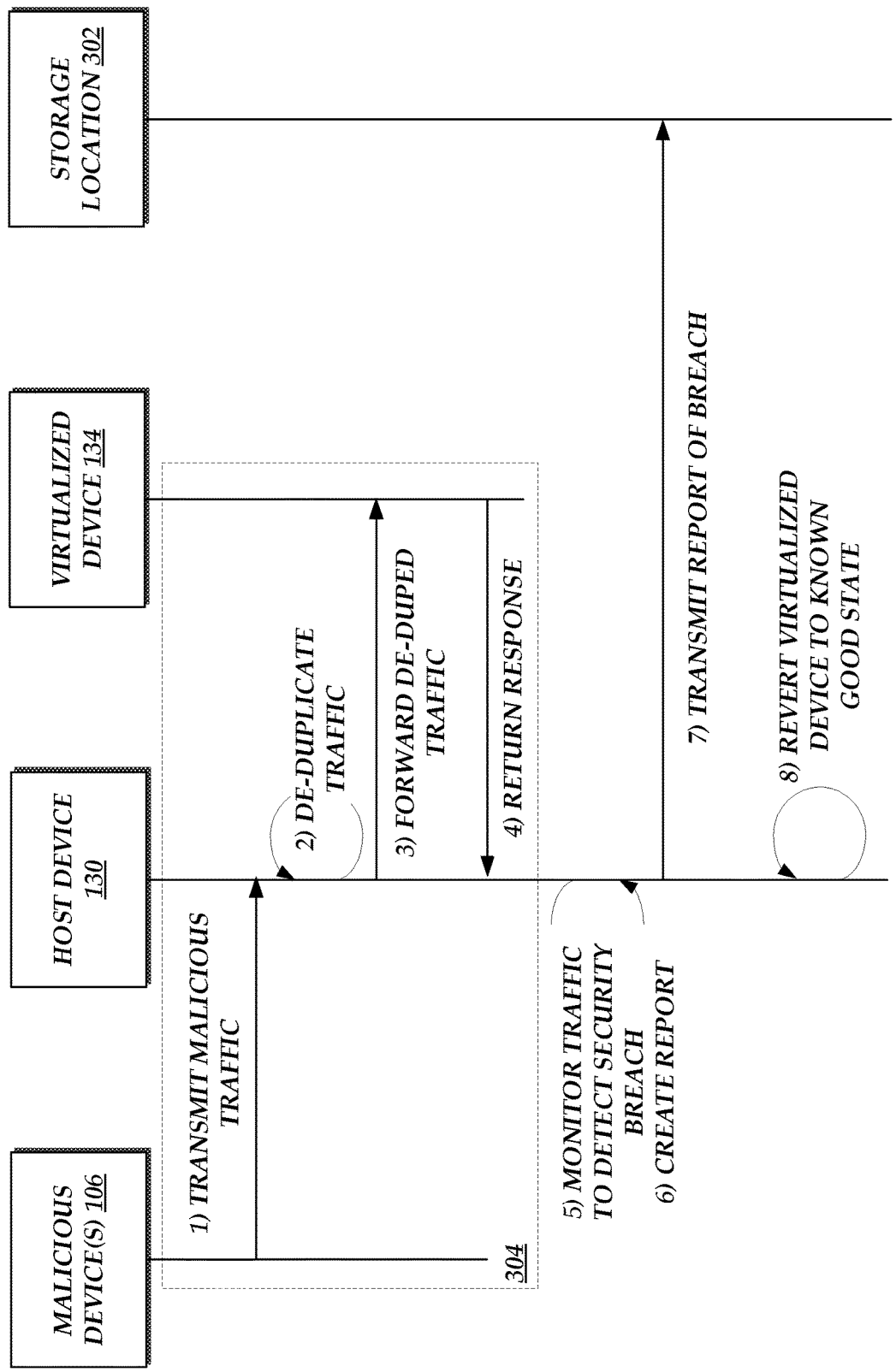
FIG. 3 depicts an example workflow for identifying and handling network attacks on the virtualized devices of the honeypot service environment, including deduplicating multiple similar attacks to reduce workload on the host devices.

With reference to FIG. 3, illustrative interactions will be described for operating a virtualized device 134 as a honeypot on the honeypot service environment 120. The interactions begin at (1), where one or more malicious devices 106 transmit malicious traffic (e.g., intended to breach security of a honeypot device) to the honeypot device. Because each honeypot device is implemented at a virtualized device 134 hosted by a host device 130, the malicious traffic is received at the host device 130. While FIG. 3 refers to such traffic as "malicious traffic," the character of the traffic as malicious may not be initially apparent at the host device 130 or other elements of the environment 120.

As discussed above, network attacks against production devices often occur en masse. For example, a bot net of malicious devices 106 may attempt to conduct a network attack against all known devices of a given type (e.g., a given model of production device, or instances of that device executing a given software version), by transmitting a communication to each known device. However, often only a single instance of an attack need be captured in order to address the attack. Accordingly, it may be unnecessarily taxing on the environment 120 to service all instances of a network attack. Thus, at (2), the host device 130 deduplicates the malicious traffic. In one embodiment, deduplication may occur with respect to all communication (e.g., packets) from a given malicious device that includes the same "payload" (e.g., a packet body as opposed to a packet header). For example, deduplication may occur where multiple communications including the same data packet body are transmitted from a single malicious device 106 to multiple virtualized devices 134, such that only a destination network address within a packet header varies among the different communications. In another embodiment, deduplication may occur where multiple communications including the same data body are transmitted from multiple malicious devices 106 to multiple virtualized devices 134, such that only source and destination network addresses within a header varies among the different communications (e.g., packets). In yet another embodiment, deduplication may occur where bodies vary among communications of the traffic, but vary in content that is immaterial to potential security breaches, such as by including randomized data (e.g., in an attempt to avoid detection as a network attack). Illustratively, such content may be specified by a client device 102 within execution parameters of the honeypot devices. For example, a client device 102 may specify one or more regular expressions indicating content that is immaterial (or, inversely, the content that is material) to potential breaches, such that deduplication can occur with respect to multiple communications with matching material content.

Deduplication can illustratively occur based on a windowing of traffic, such that all traffic received within a given window (e.g., 10 milliseconds, 100 milliseconds, one second, etc.) is subject to deduplication. In one embodiment, a single instance of a given type of traffic is selected for forwarding after deduplication. In other embodiments, multiple instances (e.g., a maximum number specified in execution parameters) are selected. While deduplication is depicted in FIG. 3 as occurring at a host device 130, deduplication may additionally or alternatively occur at other devices within a network path to the virtualized device. For example, where virtualized devices 134 representing honeypots of a given type of device are distributed among multiple host devices 130, one or more router or other devices within the network 108 may obtain all traffic to the given type of device and perform deduplication of that traffic. In some instances, one or more load balancing devices may be utilized to route all traffic to a given type of device to a deduplication device. For example, each load balancing device may inspect traffic to determine a content of that traffic (e.g., by hashing a body of traffic packets) and forward packets with the same or similar content to a deduplication device. Thus, a deduplication device may obtain multiple instances of a given type of malicious traffic and perform deduplication of that traffic.

Thereafter, at (3), the host device 130 (or other deduplication device), forwards an instance of the malicious traffic to a virtualized device 134 operating as a honeypot. The device 134 in turn, processes the traffic and provides a response to the host device 130. The host device 130 may then forward the response as appropriate to the response. For example, if the response is addressed to the malicious device 106, the host device 130 can forward the response to the device 106. In some embodiments, where the response is addressed to the malicious device 106 and other traffic from other malicious devices 106 was discarded during the deduplication process, the response of the virtualized device 134 may also be provided to the other malicious devices 106, such that it appears to the other devices 106 that they have successfully interacted with the device 134. If the response is addressed to another network location, the host device 130 can forward that response to the other network location. For purposes of analyzing network attacks, the content of a response obtained at the host device 130 is generally sufficient, and as such, further forwarding of traffic from the host device 130 is not shown in FIG. 3.

Interactions (1)-(4) may occur one or more times during a network attack. For example, a given network attack may depend on a series of interactions between a malicious device 106 and a honeypot device. Thus, interactions (1)-(4) are shown in FIG. 3 as a loop 304.

During and after loop 304, the host device 130, at (5), monitors traffic to and from the virtualized device 134 to detect any security breaches. As discussed above, one or more rules may be utilized to detect whether traffic to the device 134 indicates a security breach. For example, in the case of a whitelist, any traffic not conforming to the whitelist may indicate a potential security breach. In the case of a blacklist, any traffic conforming to the blacklist (e.g., traffic indicating use of authenticated APIs, for example) may indicate a potential breach. In some embodiments, the host device 130 may flag any traffic from the virtualized device 134 that is responsive to traffic from an external device (e.g., a malicious device 106) as indicative of a security breach. For example, the virtualized device 134 may be configured such that a response is only expected for legitimate users of the device, of which none exist (given its use as a honeypot). As such, any response from the device 134 may be considered indicative of a breach. In still more embodiments, a host device 130 may factor deduplication into whether network traffic is identified as a potential breach. For example, a breach may be determined to be more likely when deduplicated traffic provokes a response from the device 134, since network attacks may be known to be typically wide-spread.

In addition to monitoring traffic to detect a breach, the host device 130 may generally monitor traffic of a virtualized device 134 to detect network attacks on the device (even if a breach does not occur). For example, the host device 130 may compare traffic to the device 130 to attack vector templates within the data store 124 to determine whether traffic represents a known type of attack. In some instances, an attack vector template may also include rules (e.g., regular expressions) specifying when a breach corresponding to the attack of the template has occurred. Thus, on detecting a given type of attack using the template, the host device 130 may compare traffic of the device 130 to the rules to determine when a breach has occurred. Comparisons to attack vector templates may further be used to generate information for reporting to a client (e.g., the type of attack that led to a breach, or types of attacks that did not result in breach).

For purposes of illustration, FIG. 3 assumes that the host device 130 detects a potential security breach at the device 134. Accordingly, at (6), the device 130 creates a report of the potential breach. The report may include, for example, one or more of identifying information of the virtualized device 134, identifying information of the malicious device 106, timing information of the potential breach (e.g., a time at which the potential breach was detected), operational information of the device 134 (e.g., resource usage, configuration details, etc.), and details of the traffic that resulted in the detection, such as a packet capture log of transmissions to and from the device 134. At (7), the host device 130 transmits the report to a storage location 302, which may be specified in execution parameters for a honeypot device. The storage location 302 may be, for example, a client device 102, a messaging server (e.g., an email server), a network-accessible object store, or the like. Illustratively, a client may monitor the storage location 302 such that they are informed when potential security breaches occur.

Because a potential security breach has occurred, operational security of the device 134 may have been compromised. As such, at (8), the host device 130 also reverts the virtualized device 134 to a known good state. In one embodiment, reversion may include rebooting the device 134. For example, the device 134 may be configured without write access to persistent memory (e.g., via a virtualized hard disk existing within non-persistent memory), and as such, rebooting the device 134 may reset the device 134 to a "clean" state. In another embodiment, the host device 130 may save a state of the device 134 just after an initial boot (e.g., a clean state), such as by taking a snapshot of the device 134. Thus, the host device 130 can revert the device 134 by resetting the device 134 to that saved state. In this manner, the environment 120 can ensure that a virtualized device 134 does not become hijacked and potentially act maliciously.

Accordingly, via the interactions of FIG. 3, network attacks at honeypots implemented by virtualized devices 134 can be monitored and detected in a secure manner. Moreover, because virtualized devices 134 are utilized that can closely resemble production devices, the honeypots may be more likely to be effect than other techniques that do not utilize virtualized production devices. Still further, because deduplication can be applied to multiple network attacks, computing resources needed to provide multiple honeypot devices is reduced and efficiency of the environment 120 is increased.

Figure 4:
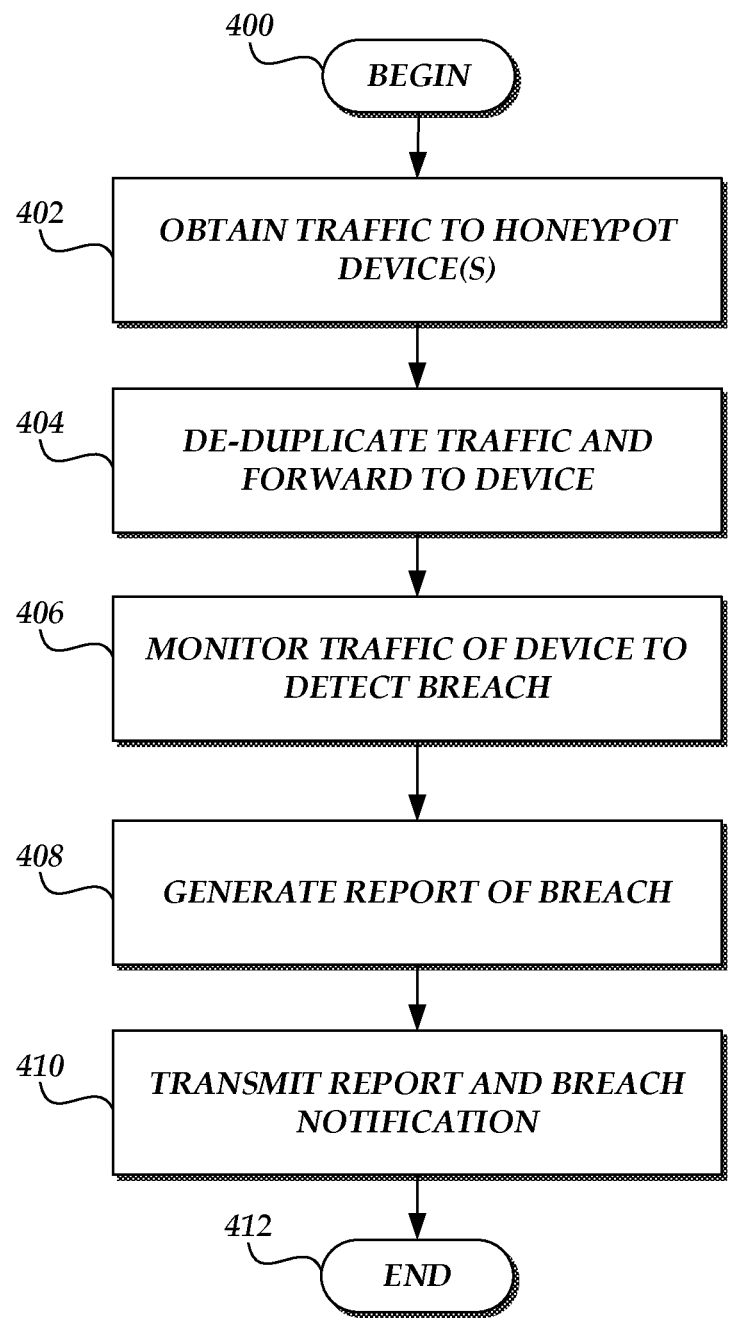
FIG. 4 is a flowchart of an example routine for utilizing virtualized devices of the honeypot service environment of FIG. 1, including deduplicating multiple similar attacks to reduce workload on the host devices.

With reference to FIG. 4, an illustrative routine 400 for efficiently implementing honeypots in a hosted environment will be described. The routine 400 may be carried out, for example, by a host device 130 of the honeypot service environment 120.

The routine 400 begins at block 402, where the host device 130 obtains traffic to one or more honeypot devices (e.g., virtualized devices 134). The traffic is illustratively transmitted by a device external to the environment 120, such as a malicious device 106.

At block 404, the host device 130 deduplications the traffic, such as by discarding all but n instances (e.g., one instance or a threshold maximum number specified in execution parameters for the honeypots) of traffic that corresponds to given traffic pattern, and forwards the de-duplicated traffic (e.g., the n instances) to the honeypots. In one embodiment, the given pattern may be a specific payload of a data packet shared among multiple packets, or a combination of such a payload and a source network address (e.g., Internet Protocol Address). In another embodiment, the given pattern may be shared material content of multiple data packets, which material content may be specified based on filtering rules (e.g., regular expressions) included within execution parameters of a honeypot. In one embodiment, the n instances of maintained traffic communications are selected at random from among all communication instances. In another embodiment, the n instances may be selected based on other criteria, such as based on load-balancing among honeypot devices (e.g., selecting to retain traffic addressed to a honeypot device with greatest load capacity, using round-robin selection, etc.). As discussed above, deduplication can beneficial reduce the computing resources required by the environment 120 to implement honeypots.

At block 406, the host device 130 monitors traffic of the honeypot device (e.g., both incoming and outgoing traffic) to detect a breach. As discussed detection of a breach may be based on traffic of the device conforming to one or more rules indicative of a breach, such as (but not limited to) traffic confirming to a blacklist, traffic not conforming to a whitelist, traffic indicative of access by an authorized user, traffic responsive to an incoming packet forming part of a wide-scale transmission, or a combination thereof.

On detection of a breach, the routine 400 proceeds to block 408, where a report of the breach is generated. As discussed above, the report can include data usable by a client to analyze a network attack that caused the breach. For example, the report may include identifying information of the honeypot, configuration or operational information of the honeypot, and timing information for the attack. In one embodiment, the report includes a log of traffic to and from the device during or around the time of the attack, such as a packet capture log including n seconds of data prior to a first packet of the attack and n seconds of data subsequent to a final packet of the attack. In some embodiments, the report may include state information of the honeypot, such as a snapshot of a virtualized device 134 implementing the honeypot before the detected breach, subsequent to the breach, or both.

As discussed above, in some embodiments the host device 130 may utilize attack vector templates to detect a type of attack that resulted in a breach, which information may be included within the report. In some instances, the report may also include other information, such as a number of detected network attacks on the honeypot device that did not result in a breach. While the routine 400 discusses generation of a report subsequent to breach, reports may additionally or alternatively be transmitted periodically to a destination location. For example, the host device 130 may generate a report for a honeypot device every 24 hours, indicating the frequency and type of attack at the honeypot and whether the honeypot was breached.

At block 410, the report and a notification of potential breach is transmitted to a destination location, such as a client device 102 or other network-accessible location specified by a client device 102. Accordingly, a client may be made aware of the potential breach, and may analyze information within the report to better understand a mechanism of the breach, such that a configuration of a corresponding production device can be modified to secure the device.

Figure 5:
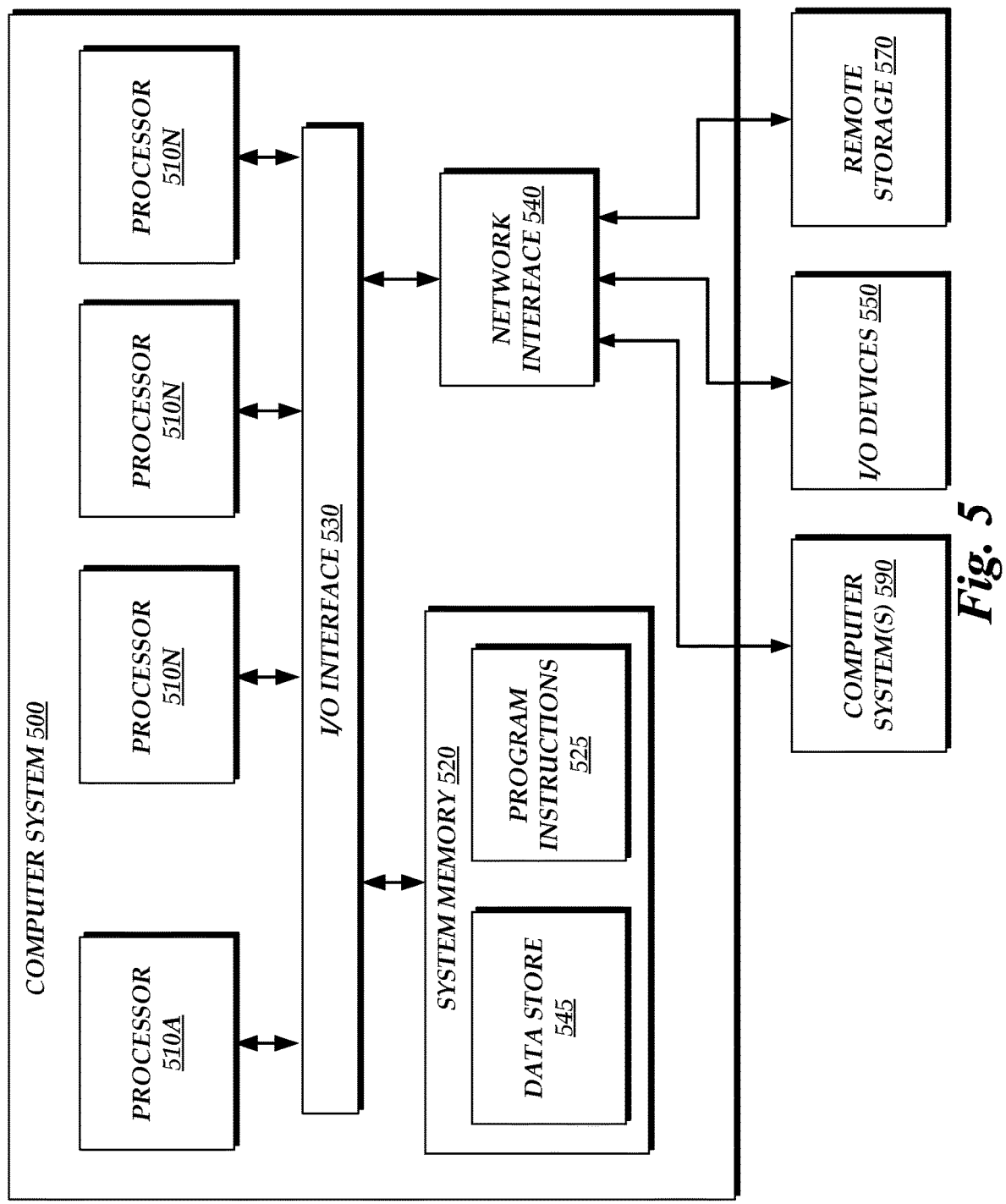
FIG. 5 depicts a schematic diagram of an example computing system that may implement aspects of the present disclosure.

FIG. 5 is a block diagram illustrating an example computer system, according to various embodiments. For example, instances of the computer system 500 may be configured to implement the control plane interface 122, host devices 130, client devices 102, and the like. Computer system 500 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 500 includes one or more processors 510 (any of which may include multiple cores, which may be single or multi-threaded) coupled to a system memory 520 via an input/output (I/O) interface 530. Computer system 500 further includes a network interface 540 coupled to I/O interface 530. In various embodiments, computer system 500 may be a uniprocessor system including one processor 510, or a multiprocessor system including several processors 510 (e.g., two, four, eight, or another suitable number). Processors 510 may be any suitable processors capable of executing instructions. For example, in various embodiments, processors 510 may be general-purpose or embedded processors implementing any of a variety of instruction set architectures (ISAs), such as the x86, PowerPC, SPARC, or MIPS ISAs, or any other suitable ISA. In multiprocessor systems, each of processors 510 may commonly, but not necessarily, implement the same ISA. The computer system 500 also includes one or more network communication devices (e.g., network interface 540) for communicating with other systems and/or components over a communications network (e.g. Internet, LAN, etc.).

In the illustrated embodiment, computer system 500 also includes one or more persistent storage devices 560 and/or one or more I/O devices 580. In various embodiments, persistent storage devices 560 may correspond to disk drives, tape drives, solid state memory, other mass storage devices, block-based storage devices, or any other persistent storage device. Computer system 500 (or a distributed application or operating system operating thereon) may store instructions and/or data in persistent storage devices 560, as desired, and may retrieve the stored instruction and/or data as needed. For example, in some embodiments, computer system 500 may act as an element of the interface 122, and persistent storage 560 may include the SSDs attached to that element to facilitate storage of device images.

Computer system 500 includes one or more system memories 520 that are configured to store instructions and data accessible by processor(s) 510. In various embodiments, system memories 520 may be implemented using any suitable memory technology (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 520 may contain program instructions 525 that are executable by processor(s) 510 to implement the routines, interactions, and techniques described herein. In various embodiments, program instructions 525 may be encoded in platform native binary, any interpreted language such as Java byte-code, or in any other language such as C/C++, Java, etc., or in any combination thereof. For example, in the illustrated embodiment, program instructions 525 may include program instructions executable to implement the functionality of a host device 120. In some embodiments, program instructions 525 may implement the control plane interface 122, or other elements of the environment 100.

In some embodiments, program instructions 525 may include instructions executable to implement an operating system (not shown), which may be any of various operating systems, such as UNIX, LINUX, Solaris, MacOS, Windows, etc. Any or all of program instructions 525 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 500 via I/O interface 530. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 500 as system memory 520 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 540.

In some embodiments, system memory 520 may include data store 545. In general, system memory 520 (e.g., data store 545 within system memory 520), persistent storage 560, and/or remote storage 570 may store information usable in implementing the methods and techniques described herein.

In one embodiment, I/O interface 530 may be configured to coordinate I/O traffic between processor 510, system memory 520 and any peripheral devices in the system, including through network interface 540 or other peripheral interfaces. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments, some or all of the functionality of I/O interface 530, such as an interface to system memory 520, may be incorporated directly into processor 510.

Network interface 540 may be configured to allow data to be exchanged between computer system 500 and other devices attached to a network, such as other computer systems 590, for example. In addition, network interface 540 may be configured to allow communication between computer system 500 and various I/O devices 550 and/or remote storage 570 (which may represent, for example, data stores 154). Input/output devices 550 may, in some embodiments, include one or more display terminals, keyboards, keypads, touchpads, scanning devices, voice or optical recognition devices, or any other devices suitable for entering or retrieving data by one or more computer systems 500. Multiple input/output devices 550 may be present in computer system 500 or may be distributed on various nodes of a distributed system that includes computer system 500. In some embodiments, similar input/output devices may be separate from computer system 500 and may interact with one or more nodes of a distributed system that includes computer system 500 through a wired or wireless connection, such as over network interface 540. Network interface 540 may commonly support one or more wireless networking protocols (e.g., Wi-Fi/IEEE 802.11, or another wireless networking standard). However, in various embodiments, network interface 540 may support communication via any suitable wired or wireless general data networks, such as other types of Ethernet networks, for example. Additionally, network interface 540 may support communication via telecommunications/telephony networks such as analog voice networks or digital fiber communications networks, via storage area networks such as Fibre Channel SANs, or via any other suitable type of network and/or protocol. In various embodiments, computer system 500 may include more, fewer, or different components than those illustrated in FIG. 5 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system for efficient implementation of honeypot devices to detect wide-scale network attacks, the system comprising:
    one or more computing devices comprising a processor and memory and configured to host a plurality of honeypot devices, each honeypot device representing a virtualized instance of a corresponding production device and being without access to a production environment of the production device;
    wherein the one or more computing devices are further configured to:
        obtain a plurality of data packets, each data packet addressed to an individual honeypot device of the plurality of honeypot devices, the plurality of data packets sharing a payload that is common among the plurality of data packets;
        deduplicate the plurality of data packets by selecting one data packet of the plurality of data packets to forward to a honeypot device of the plurality of honeypot devices and discarding remaining data packets within the plurality of data packets;
        forwarding the one data packet to the honeypot device;
        obtaining a response to the one data packet from the honeypot device;
        analyze the one data packet and the response to identify a potential security breach of the honeypot device; and
        transmit a notification of the potential security breach.

2. The system of claim 1, wherein the production device is an Internet-of-Things device.

3. The system of claim 1, wherein the production device is configured to provide network-access to sensor data regarding the production environment, and wherein individual honeypot devices are configured to provide network-access to fabricated sensor data.

4. The system of claim 1, wherein the notification includes a record of the one data packet and the response.

5. A computer-implemented method comprising:
    obtaining a plurality of data packets, each data packet addressed to an individual honeypot device of a plurality of honeypot devices, wherein each honeypot device represents a virtualized instance of a corresponding production device and being without access to a production environment of the production device, and wherein the plurality of data packets share a set of content that is common among the plurality of data packets;
    deduplicating the plurality of data packets by selecting at least one data packet of the plurality of data packets to forward to a honeypot device of the plurality of honeypot devices and discarding remaining data packets within the plurality of data packets;
    forwarding the at least one data packet to the honeypot device;
    obtaining a response to the at least one data packet from the honeypot device;
    analyzing the at least one data packet and the response to identify a potential security breach of the honeypot device; and
    transmitting a notification of the potential security breach.

6. The computer-implemented method of claim 5 further comprising providing the response to a device that transmitted the at least one data packet.

7. The computer-implemented method of claim 5 further comprising providing the response to one or more devices that transmitted the discarded remaining data packets.

8. The computer-implemented method of claim 5, wherein deduplicating the plurality of data packets by selecting at least one data packet of the plurality of data packets to forward to the honeypot device further comprises selecting an additional data packet of the plurality of data packets to forward to a second device of the plurality of devices.

9. The computer-implemented method of claim 5 further comprising reverting the honeypot device to a known good state subsequent to identification of the potential security breach.

10. The computer-implemented method of claim 9, wherein the honeypot device is implemented without write access to persistent data storage, and wherein reverting the honeypot device to the known good state subsequent to identification of the potential security breach comprises rebooting the honeypot device.

11. The computer-implemented method of claim 10, wherein reverting the honeypot device to the known good state subsequent to identification of the potential security breach comprises restoring the honeypot device using a snapshot associated with the known good state.

12. The computer-implemented method of claim 10, wherein the honeypot device is implemented at a host computing device, and wherein the method comprises deduplicating the plurality of data packets at a network device distinct from the host computing device.

13. The computer-implemented method of claim 10, wherein the honeypot device is implemented at a host computing device, and wherein the method comprises deduplicating the plurality of data packets at the host computing device.

14. The computer-implemented method of claim 5 further comprising comparing the at least one data packet to an attack vector template to identify a type of attack represented by the at least one data packet, wherein the notification indicates the type of attack.

15. Non-transitory computer-readable storage media comprising computer-executable instructions that, when executed by a computing system, causes the computing system to:
    obtain a plurality of data packets, each data packet addressed to an individual honeypot device of a plurality of honeypot devices, wherein each honeypot device represents a virtualized instance of a corresponding production device and being without access to a production environment of the production device, and wherein the plurality of data packets share a set of content that is common among the plurality of data packets;
    deduplicate the plurality of data packets by selecting at least one data packet of the plurality of data packets to forward to a honeypot device of the plurality of honeypot devices and discarding remaining data packets within the plurality of data packets;
    forward the at least one data packet to the honeypot device;
    obtain a response to the at least one data packet from the honeypot device;
    analyze the at least one data packet and the response to identify a potential security breach of the honeypot device; and
    transmit a notification of the potential security breach.

16. The non-transitory computer-readable storage media of claim 15, wherein the plurality of data packets share a source network address.

17. The non-transitory computer-readable storage media of claim 15, wherein the plurality of data packets indicate a plurality of source network addresses.

18. The non-transitory computer-readable storage media of claim 15, wherein the notification includes one or more of a record of communications of the honeypot device, a configuration of the honeypot device, state information of the honeypot device, or timing information of the potential security breach.

19. The non-transitory computer-readable storage media of claim 15, wherein the set of content that is common among the plurality of data packets corresponds to a portion of a body of the data packets that is pre-defined as material.

20. The non-transitory computer-readable storage media of claim 15, wherein to analyze the at least one data packet and the response to identify the potential security breach of the honeypot device, the instructions cause the computing system to compare the response to a blacklist of traffic patterns associated with potential security breaches.

21. The non-transitory computer-readable storage media of claim 15, wherein to analyze the at least one data packet and the response to identify the potential security breach of the honeypot device, the instructions cause the computing system to compare the response to a whitelist of traffic patterns associated with a lack of a security breach.

* * * * *